United States Patent
Ballapuram et al.

(10) Patent No.: US 12,487,951 B2
(45) Date of Patent: *Dec. 2, 2025

(54) SYSTEMS AND METHODS FOR SERVICING DATA ACCESS COMMANDS

(71) Applicant: Samsung Electronics Co., Ltd., Suwon-si (KR)

(72) Inventors: Chinnakrishnan Ballapuram, San Jose, CA (US); Wentao Wu, San Jose, CA (US)

(73) Assignee: Samsung Electronics Co., Ltd., Yongin-si (KR)

(*) Notice: Subject to any disclaimer, the term of this patent is extended or adjusted under 35 U.S.C. 154(b) by 104 days.

This patent is subject to a terminal disclaimer.

(21) Appl. No.: 18/107,446

(22) Filed: Feb. 8, 2023

(65) Prior Publication Data

US 2023/0185743 A1     Jun. 15, 2023

Related U.S. Application Data

(63) Continuation of application No. 15/384,164, filed on Dec. 19, 2016, now Pat. No. 11,586,565.

(60) Provisional application No. 62/403,626, filed on Oct. 3, 2016.

(51) Int. Cl.
  *G06F 13/18* (2006.01)
  *G06F 13/16* (2006.01)
  *G06F 13/40* (2006.01)
  *G06F 13/42* (2006.01)

(52) U.S. Cl.
  CPC .......... *G06F 13/18* (2013.01); *G06F 13/1668* (2013.01); *G06F 13/4068* (2013.01); *G06F 13/4282* (2013.01); *G06F 2213/0026* (2013.01)

(58) Field of Classification Search
  CPC .................................................. G06F 13/18
  USPC ........................................................ 710/105
  See application file for complete search history.

(56) References Cited

U.S. PATENT DOCUMENTS

| | | | |
|---|---|---|---|
| 7,363,417 B1 * | 4/2008 | Ngai | ............ G06F 13/4022 710/316 |
| 7,702,839 B2 | 4/2010 | Klint et al. | |
| 7,904,638 B2 | 3/2011 | Adachi | |
| 8,151,038 B2 | 4/2012 | Luo et al. | |
| 8,180,931 B2 | 5/2012 | Lee et al. | |
| 8,255,615 B1 | 8/2012 | Yoon et al. | |
| 8,495,471 B2 | 7/2013 | Antonakopoulos et al. | |

(Continued)

FOREIGN PATENT DOCUMENTS

| | | |
|---|---|---|
| JP | 5054818 B2 | 10/2012 |
| KR | 10-2007-0120596 A | 12/2007 |
| KR | 10-2008-0099336 A | 11/2008 |

OTHER PUBLICATIONS

Microsoft Computer Dictionary.

*Primary Examiner* — Titus Wong
(74) *Attorney, Agent, or Firm* — Lewis Roca Rothgerber Christie LLP

(57) ABSTRACT

A non-volatile storage system includes: a host and a storage device. The host includes a submission queue memory, a completion queue memory, and a read/write data memory, and the storage device includes: a controller configured to concurrently communicate with the read/write data memory and with at least one of the submission queue memory and the completion queue memory; and a memory device configured to communicate with the controller.

19 Claims, 7 Drawing Sheets

(56) References Cited

U.S. PATENT DOCUMENTS

| | | |
|---|---|---|
| 8,700,834 B2 | 4/2014 | Horn et al. |
| 9,021,168 B1 | 4/2015 | Horn et al. |
| 9,128,662 B2 | 9/2015 | Kim et al. |
| 9,304,692 B2 | 4/2016 | Nguyen et al. |
| 9,354,872 B2 | 5/2016 | Amidi et al. |
| 10,007,443 B1 * | 6/2018 | Rajadnya .............. G06F 3/0613 |
| 2007/0067548 A1 * | 3/2007 | Juenger .............. G06F 13/4063 |
| | | 710/315 |
| 2007/0094437 A1 * | 4/2007 | Jabori .................... G06F 1/206 |
| | | 710/307 |
| 2007/0239926 A1 | 10/2007 | Gyl et al. |
| 2010/0185811 A1 | 7/2010 | Kwon |
| 2011/0182216 A1 * | 7/2011 | Ono ......................... H04L 5/16 |
| | | 370/282 |
| 2013/0268710 A1 * | 10/2013 | Lowe ................. G06F 13/4022 |
| | | 710/306 |
| 2014/0095737 A1 | 4/2014 | Paragaonkar et al. |
| 2014/0195720 A1 | 7/2014 | Akella et al. |
| 2015/0046625 A1 | 2/2015 | Peddle et al. |
| 2015/0378605 A1 * | 12/2015 | Huang ............... H04L 67/1004 |
| | | 711/103 |
| 2016/0085718 A1 * | 3/2016 | Huang .................... G06F 13/00 |
| | | 709/213 |
| 2016/0210062 A1 * | 7/2016 | McCambridge ...... G06F 3/0688 |
| 2016/0217104 A1 | 7/2016 | Kamble et al. |
| 2017/0060422 A1 | 3/2017 | Sharifie et al. |
| 2018/0034790 A1 * | 2/2018 | Mundra ............. H04W 12/069 |
| 2018/0060266 A1 | 3/2018 | Garibay et al. |
| 2018/0069923 A1 * | 3/2018 | Tsalmon ........... G06F 15/17331 |
| 2023/0127976 A1 * | 4/2023 | Dreier .................. G06F 3/0679 |
| | | 398/139 |

\* cited by examiner

SYSTEMS AND METHODS FOR SERVICING DATA ACCESS COMMANDS

CROSS-REFERENCE TO RELATED APPLICATION

This application is a continuation of U.S. patent application Ser. No. 15/384,164 filed Dec. 19, 2016, which claims priority to and the benefit of U.S. Provisional Patent Application Ser. No. 62/403,626, filed Oct. 3, 2016 and entitled "SERVICING YOUNGER READS UNDER OLDER WRITE DATA IN SSDS," the entire content of each of which is incorporated herein by reference.

BACKGROUND

1. Field

Aspects of example embodiments of the present invention relate to a non-volatile storage system and a data storage access protocol for non-volatile storage devices.

2. Related Art

Recently, a demand for high-capacity, high-performance storage devices has increased. For example, file sizes continue to increase as digital content becomes even more complex. In addition, cloud computing has become more popular, allowing users to remotely store and access large amounts of data, giving users freedom to work on more compact devices while not being constrained by local storage limitations. However, these advancements have placed additional burdens on existing data centers, servers, and data access protocols by increasing both the amount of data that is being transferred between the data center and the users and the number of users concurrently accessing data stored on storage devices in the data center.

Compared to traditional non-volatile storage devices, such as hard disk drives (HDDs) and tape drives (often referred to as magnetic storage devices), recently-developed non-volatile storage devices have significantly improved access times, transfer rates, and input/output operations per second (IOPS), including significantly improved random read/write IOPS. Such non-volatile storage devices include, as some examples, flash memory devices, phase-change random access memory (PRAM), spin-transfer torque random access memory (STT-RAM), and resistive random access memory (ReRAM). These devices are often referred to as solid-state storage devices and/or solid-state drives.

Such solid-state storage devices, such as flash memory devices, have slower or significantly slower write performance (e.g., write IOPS) than read performance (e.g., read IOPS), unlike traditional HDDs and the like, which generally have substantially similar read and write performance. This may be due to solid-state drives needing to perform a garbage collection operation, or erasing of a memory cell, prior to writing new data to that memory cell, thereby increasing the number of operations that are executed to write new data to the solid-state drive.

Conventional storage systems and data storage access protocols may not efficiently utilize solid-state drives in view of the above-discussed characteristics of solid-state drives. For example, some of the benefits of solid-state storage devices, such as faster read speeds than write speeds and the ability to concurrently handle read and write commands, are not utilized or are not efficiently utilized by convention data storage access protocols. For example, while a solid-state storage device may be able to complete multiple read commands (e.g., commands to retrieve and pass data from the storage device to a host) in the time it takes the solid-state storage device to complete one write command (e.g., a command to read data from the host and to write that data to the storage device), younger read commands (e.g., read commands generated after a preceding command, such as a preceding write command) cannot be retrieved or acted upon by the solid-state storage device until it completes the older write command (e.g., the preceding write command). Thus, the faster read speeds of solid-state drives and the ability to concurrently handle read and write commands are not adequately utilized by such conventional data access protocols.

SUMMARY

The present disclosure is directed toward various embodiments of a non-volatile storage system and a data storage access protocol for non-volatile storage devices providing improved IOPS performance by, for example, servicing younger read commands under older write commands.

According to one embodiment of the present invention, a non-volatile storage system includes a host and a storage device. The host includes a submission queue memory, a completion queue memory, and a read/write data memory, and the storage device includes: a controller configured to concurrently communicate with the read/write data memory and with at least one of the submission queue memory and the completion queue memory; and a memory device configured to communicate with the controller.

The controller may be configured to concurrently receive data from the read/write data memory and from the submission queue memory, a physical interface connecting the controller and the host to each other may be configured for the host to concurrently send data from both the read/write data memory and the submission queue memory by utilizing either dedicated lanes or dynamically configurable lanes of the physical interface, and the physical interface may operate according to a protocol. The protocol may be configured to prioritize data from the submission queue memory over the data from the read/write data memory via the physical interface.

The controller may be configured to concurrently receive data from the read/write data memory and transmit data to the completion queue memory, the physical interface may be configured for the host to concurrently send data from the read/write data memory and transmit data to the completion queue memory by utilizing either the dedicated lanes or the dynamically configurable lanes, and the protocol may be configured to prioritize data to the completion queue memory over the data from the read/write data memory via the physical interface.

The controller may be configured to concurrently communicate with the read/write data memory via a data interface and with the at least one of the submission queue memory and the completion queue memory via a command interface.

The storage device may be configured to communicate with the host via a peripheral component interconnect express (PCIe) bus having a plurality of lanes.

The command interface may include some of the lanes of the PCIe bus, and the data interface may include the remaining lanes of the PCIe bus.

The command interface may be configured to selectively transmit data between the controller and the read/write data memory and between the controller and the at least one of the submission queue memory and the completion queue memory.

According to another embodiment of the present invention, a method of data storage access between a remote initiator and a non-volatile storage device via a target host includes: transmitting a write command from the remote initiator to the storage device via the target host; transmitting write data corresponding to the write command from the remote initiator to the storage device via the target host; transmitting a command from the remote initiator to the storage device via the target host concurrently with the transmitting the write data to the storage device from the target host; and, when the command is a read command, transmitting read data from storage device to the target host in response to the read command.

The method may further include transmitting an in-capsule command and data from the remote initiator to the storage device via the target host concurrently with the transmitting the write data to the storage device via the target host.

The remote initiator (or a plurality of remote initiators) and the target host may be connected to each other through any suitable underlying network protocol, such as Ethernet, etc. Further, the target host may have one or more than one port having different underlying interfaces and protocols through which multiple remote initiators may connect to the target host simultaneously.

The write command, and the read command, and any other storage command may be transmitted between the target host and the storage device via a command interface, and the write data and the read data may be transmitted between the target host and the storage device via a data interface different from the command interface.

The method may further include: transmitting a second completion entry from the storage device to the target host when the transmitting of the read data is completed; and transmitting a first completion entry from the storage device to the target host when the transmitting of the write data is completed. The transmitting the second completion entry may occur before the transmitting the first completion entry.

The write command and the read command may be transmitted from the target host to the storage device via a command interface, the write data may be transmitted from the target host to the storage device via a first data interface, and the read data may be transmitted from the storage device to the target host via a second data interface. Each of the command interface, the first data interface, and the second data interface may be different from each other.

The command interface, the first data interface, and the second data interface may be separate AXI interfaces between the target host and the controller.

The transmitting the write data via the first data interface and the transmitting the read data via the second data interface may occur concurrently.

According to another embodiment of the present invention, a method of data storage access between a host and a non-volatile storage device, the host including a processor and a host memory, and the non-volatile storage device including a controller and a memory device, includes: transmitting a write command from the host to the controller via a command interface; transmitting write data from the host memory to the controller via a data interface; and concurrently transmitting another command from the host to the controller via the command interface as the write data is transmitted from the host to the controller via the data interface.

The method may further include concurrently transmitting data from the memory device to the host via the data interface as the transmitting the write data from the host to the controller via the data interface.

The method may further include concurrently transmitting the write data from the host to the controller via the command interface and the data interface.

The method may further include transmitting a completion entry corresponding to the write command to the host via the command interface.

The host and the controller may communicate via a peripheral component interconnect express (PCIe) bus having a plurality of lanes. Some of the lanes may be dedicated as the command interface, and the remaining lanes may be dedicated as the data interface.

The host and the controller may communicate via a plurality of AXI interfaces. At least one of the AXI interfaces may be dedicated as the command interface, and at least two of the AXI interfaces may be dedicated as the data interface.

The host memory may include a submission queue configured to store commands, and the lanes dedicated as the command interface may be configured to transmit the write data when there are no pending commands in the submission queue.

A second completion entry corresponding to completion of the read command may be transmitted to the host via the command interface before a first completion entry corresponding to completion of the write command is transmitted to the host.

This summary is provided to introduce a selection of features and concepts of example embodiments of the present invention that are further described below in the detailed description. This summary is not intended to identify key or essential features of the claimed subject matter nor is it intended to be used in limiting the scope of the claimed subject matter. One or more of the described features according to one or more example embodiments may be combined with one or more other described features according to one or more example embodiments to provide a workable device.

DETAILED DESCRIPTION

Figure 1:
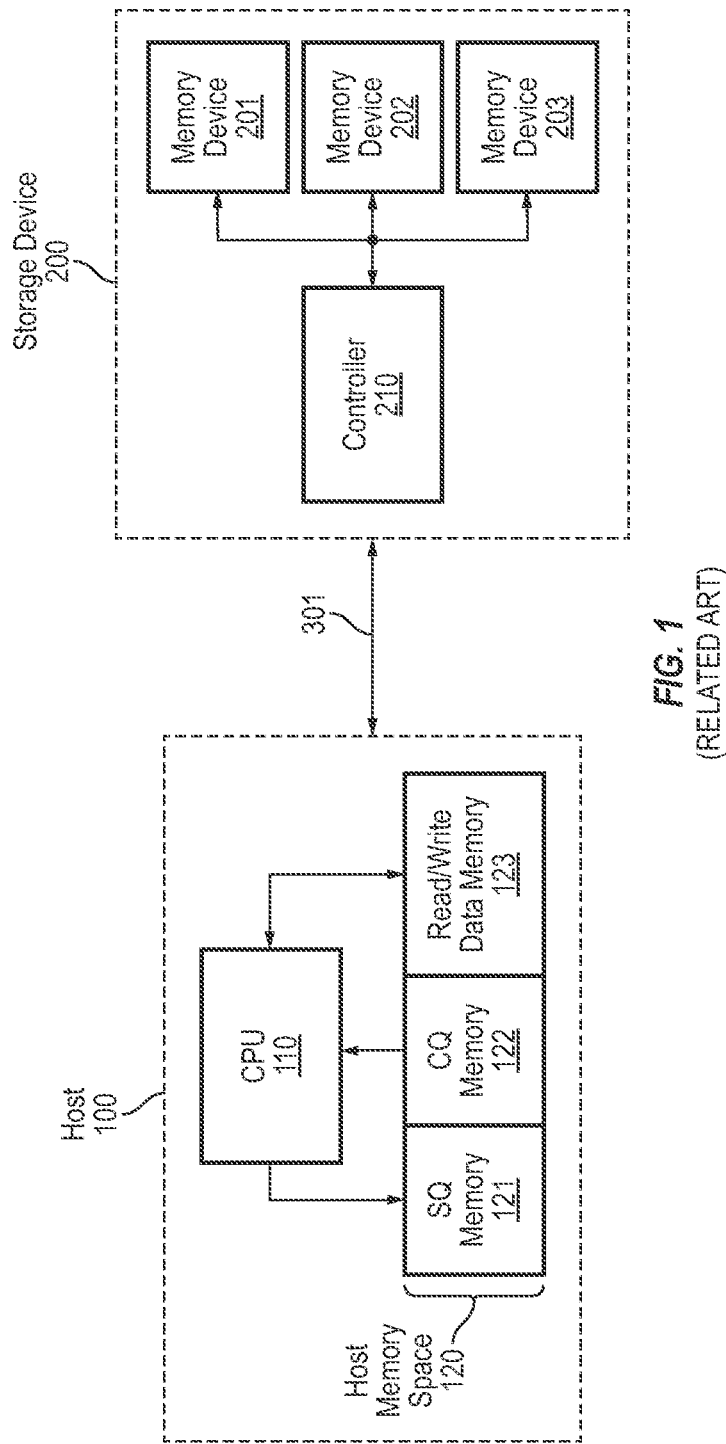
FIG. 1 illustrates a conventional data communication configuration between a host and a storage device.

The present disclosure is directed toward various example embodiments of a non-volatile storage system and a data storage access protocol for non-volatile storage devices. In one example embodiment, a non-volatile storage system includes a host, such as a local host or a target host, and a solid-state storage device. The host may include a processor, such as a central processing unit (CPU) and/or a field-programmable gate array (FPGA), and a host memory, such as static random-access memory (SRAM) and/or dynamic random-access memory (DRAM), configured to communicate with the processor. The host memory may include a submission queue memory, a completion queue memory, and a read/write data memory. The solid-state storage device may include a controller and a plurality of solid-state memory devices configured to communicate with the controller. The controller may be configured to concurrently communicate with at least one of the submission queue memory and the completion queue memory and with the read/write data memory, thereby improving random read/write IOPS of the solid-state storage device. In other examples, a data storage access protocol for such a non-volatile storage system is provided. Further, the present invention is not limited to solid-state storage devices and is applicable to traditional magnetic storage devices, such as HDDs and tape drives, as well as future storage devices based on emerging solid-state technologies such as 3D-Xpoint or phase-change memory.

Hereinafter, example embodiments of the present invention will be described, in more detail, with reference to the accompanying drawings, in which like reference numbers refer to like elements throughout. The present invention, however, may be embodied in various different forms, and should not be construed as being limited to only the embodiments illustrated herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof may not be repeated.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

It will be understood that when an element is referred to as being "connected to" or "coupled to" another element, it can be directly connected to or coupled to the other element, or one or more intervening elements may be present. In addition, it will also be understood that when an element is referred to as being "between" two elements, it can be the only element between the two elements, or one or more intervening elements may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components but do not preclude the presence or addition of one or more other features, integers, steps, operations, elements, components, and/or groups thereof. That is, the processes, methods, and algorithms described herein are not limited to the operations indicated and may include additional operations or may omit some operations, and the order of the operations may vary according to some embodiments. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "example" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

The processor, storage controller, memory devices, central processing unit (CPU), field-programmable gate array (FPGA), and/or any other relevant devices or components according to embodiments of the present invention described herein may be implemented utilizing any suitable hardware, firmware (e.g., an application-specific integrated circuit), software, and/or a suitable combination of software, firmware, and hardware. For example, the various components of the processor, storage controller, memory devices, CPU, and/or the FPGA may be formed on one integrated circuit (IC) chip or on separate IC chips. Further, the various components of the processor, storage controller, memory devices, CPU, and/or the FPGA may be implemented on a flexible printed circuit film, a tape carrier package (TCP), a printed circuit board (PCB), or formed on a same substrate as the processor, storage controller, memory devices, CPU, and/or the FPGA. Further, the various components of the processor, storage controller, memory devices, CPU, and/or the FPGA may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device or the functionality of a particular computing device may be distributed across one or more other computing devices without departing from the scope of the exemplary embodiments of the present invention.

Figure 2:
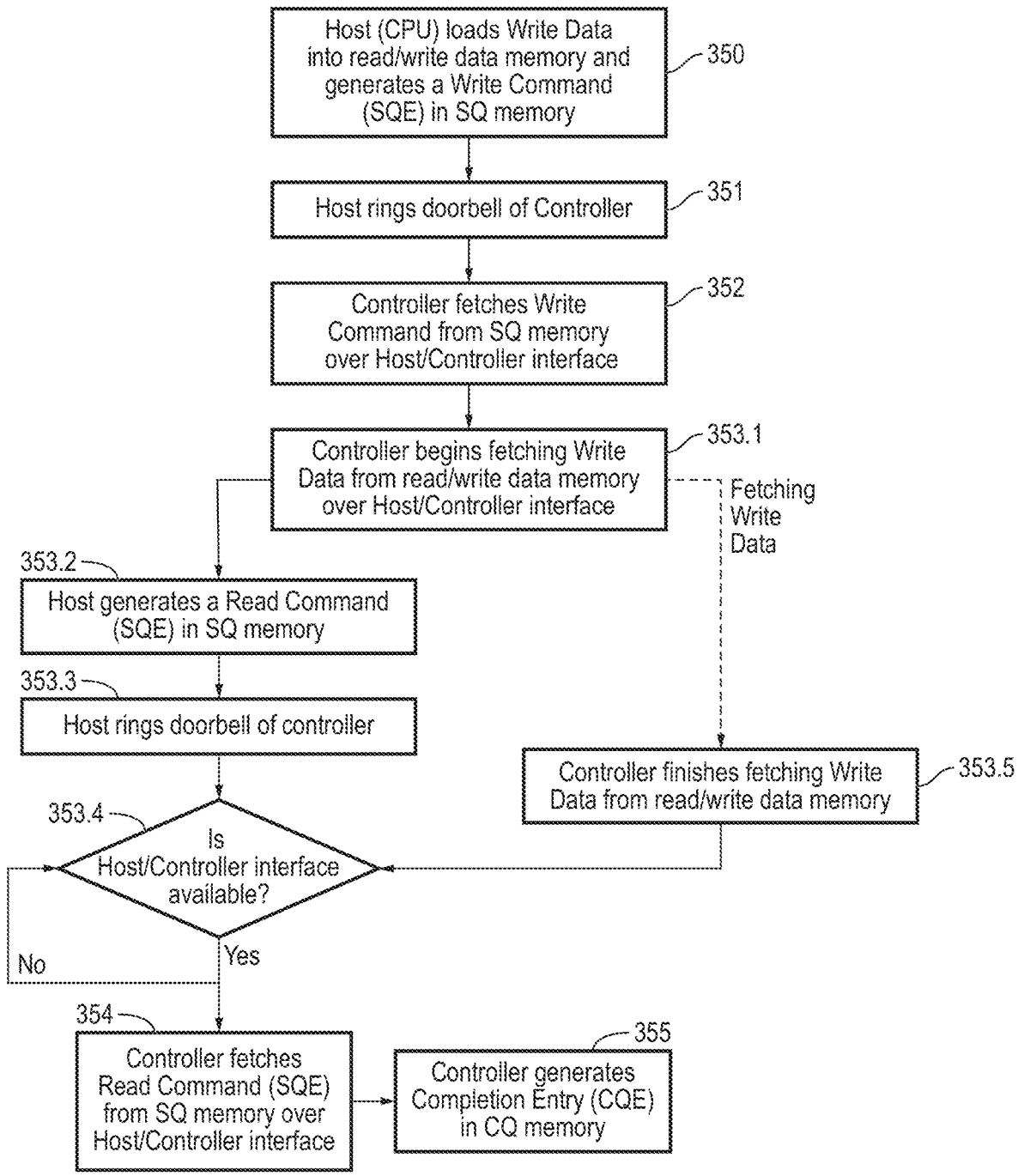
FIG. 2 is a flowchart illustrating a conventional data storage access protocol.

FIG. 1 illustrates a conventional data communication configuration utilizing using a conventional data storage access protocol between a host and a storage device, and FIG. 2 is a flowchart illustrating a conventional data storage access protocol of FIG. 1. Here, the conventional data storage access protocol may be the Non-Volatile Memory Express (NVMe) (or Non-Volatile Memory Host Controller Interface Specification (NVMHCI)) communication protocol over a Peripheral Component Interconnect Express (PCIe) bus. In FIG. 1, the host 100 may include a processor 110, such as a central processing unit (CPU) and/or a field-programmable gate array (FPGA), coupled to a memory 120, such as a static random-access memory (SRAM) or dynamic random-access memory (DRAM). The processor 110 may be any well-known CPU and/or FPGA configured to execute instructions and to communicate with other components and devices in a computer system. The memory 120 may be a host memory space 120 and may include a submission queue memory (SQ memory) 121 (or a request queue), a completion queue memory (CQ memory) 122 (or a response queue), and a read/write data memory 123. The host memory space 120 may be integral with the processor 110 (e.g., the processor 110 and the host memory space 120 may be on a same die). Each of the SQ memory 121, the CQ memory 122, and the read/write data memory 123 may be partitions of the host memory space 120. The storage device 200 may include a controller 210 and a plurality of memory devices 201-203 (e.g., solid-state memory devices or magnetic memory devices), such as flash memory devices or chips. The controller 210 is configured to control (e.g., to update) the memory devices 201-203 (e.g., to handle writes, rewrites, and erases to the memory devices 201-203).

Referring to FIGS. 1 and 2, the host 100 and the storage device 200 may communicate with each other by using a conventional NVMe protocol over a PCIe bus as follows: the host 100 (e.g., the processor 110) adds a command, such as a write command or a read command, into the submission queue (SQ) memory 121 (step 350). The command (e.g., the write command or the read command) may be known as a submission queue entry (SQE). In step 350, the host 100 generates a write command in the SQ memory 121. Then, the host rings a doorbell of the controller 210 of the storage device 200 indicating that the SQE (e.g., the write command) is in the SQ memory 121 (step 351). In response to the doorbell, the controller 210 fetches (e.g., retrieves and/or reads) the SQE from the SQ memory 121 over a Host/Controller interface 301 (step 352). In the present embodiment, the Host/Controller interface 301 refers to the PCIe bus, but the Host/Controller interface is not limited thereto. The Host/Controller interface may be any suitable communication interface or bus between a host and a controller of storage device.

While SQE is being used to designate the read and write commands through this specification, NVMe provides for at least 13 commands, in addition to additional custom commands, as those skilled in the art would understand. Thus, as used herein, SQE is not limited to read and write commands and may designate any suitable commands used in communication between a host and a solid-state storage device.

When a write command is issued by the host 100, the read/write data memory 123 stores (e.g., temporarily stores or caches) write data that is to be read by and written to the storage device 200 (e.g., read by the controller 210 and written to one or more of the memory devices 201-203 of the storage device 200) in the read/write data memory 123.

Once the controller 210 has read the SQE in the SQ memory 121, the controller 210 begins fetching (e.g., begins reading) the write data to be written to the storage device 200 from the read/write data memory 123 in response to the SQE (step 353.1). The host 100 sends the write data from the read/write data memory 123 to the controller 210 via the Host/Controller interface 301. When the Host/Controller interface 301 is the PCIe bus, the host 100 may send the write data from the read/write data memory 123 to the controller 210 by utilizing all of the available lanes. For example, when eight PCIe lanes are available between the host 100 and the storage device 200, the write data may be transmitted by utilizing all eight PCIe lanes to, for example, maximize transfer speed.

While the write data is being sent by the host 100 from the read/write data memory 123 via the Host/Controller interface 301, the host 100 may generate another command (SQE) (e.g., a read command) in the SQ memory 121 (step 353.2). Because this other command is generated after the write command, this other command may be considered a younger command (e.g., a younger read command) with reference to the older write command. When the younger command is a read command, it instructs the controller 210 to read certain data (e.g., read data) from the memory devices 201-203 and then transfer the read data to the read/write data memory 123 via the Host/Controller interface 301. The host 100 then rings a doorbell of the controller 210 indicating that another SQE (e.g., the write command) is in the SQ memory 121 (step 353.3).

While the Host/Controller interface 301 is being utilized to transfer the write data from the read/write data memory 123 to the controller 210 in response to the older write command, the host 100 is unable to send the younger read command (i.e., the queued SQE) in the SQ memory 121 in response to the controller 210 read-SQE, because the Host/Controller interface 301 is completely utilized to transfer the write data (e.g., all eight lanes of the Host/Controller interface 301 are utilized to transfer the write data). Therefore, the host 100 must wait until the transfer of the write data from the read/write data memory 123 is completed to fetch the younger read command from the SQ memory 121 (step 353.4). During this time, various read channels in the storage device 200 (e.g., read channels between the controller 210 and the memory devices 201-203) may be idle even though the controller 210 may be configured to (e.g., may have sufficient channels to) concurrently retrieve the write data from the read/write data memory 123 and the requested read data from the memory devices 201-203.

After the host 100 finishes sending the write data from the read/write data memory 123 (step 353.5), the controller 210 generates a completion entry (e.g., a completion queue entry or CQE) in the CQ memory 122 via the Host/Controller interface 301. Immediately after the host 100 completes sending the write data, the host 100 can start sending SQE commands or a new set of write data in response to the controller commands (fetch SQE and/or fetch-write-data from controller 210 that is queued in host 100). However, in some cases, the younger read command may be fetched from the SQ memory 121 after the controller 210 finishes fetching the write data but before the completion entry is generated in the CQ memory 122.

While the host 100 is sending the write data, the host 100 can also immediately start sending SQE commands using the dedicated, shared, or prioritized command/data interface and share the bandwidth between SQE traffic and write data.

Once the controller 210 has fetched the read command, it executes the read command by, for example, retrieving the requested read data from the memory devices 201-203 and passes the read data to the read/write data memory 123 via the Host/Controller interface 301. After the read data is transmitted to the read/write data memory 123, the controller 210 generates another completion entry (CQE) corresponding to the read command in the CQ memory 122 (step 355). After the completion entry is generated in the CQ memory 122 (step 355), the Host/Controller interface 301 is again released (e.g., is no longer being utilized to transfer data), and the Host/Controller interface 301 is available for the controller 210 to fetch any subsequent commands (SQEs) from the SQ memory 121 and to repeat the above-described steps. However, when there are pending SQEs in the SQ memory 121, the controller 210 may fetch the pending SQE from the SQ memory 121 after the read data is transmitted to the read/write data memory 123 but before the completion entry (CQE) corresponding to the read command is generated in the CQ memory (122).

Because the host 100 is unable to send the younger read command until the write data corresponding to the older write command is sent, the solid-state storage device 200 is not efficiently utilized because communication channels between the controller 210 and the memory devices 201-203 are not fully utilized (e.g., are not utilized for reading and/or are not saturated) while the controller 210 fetches the write data from the host 100.

Figure 3:
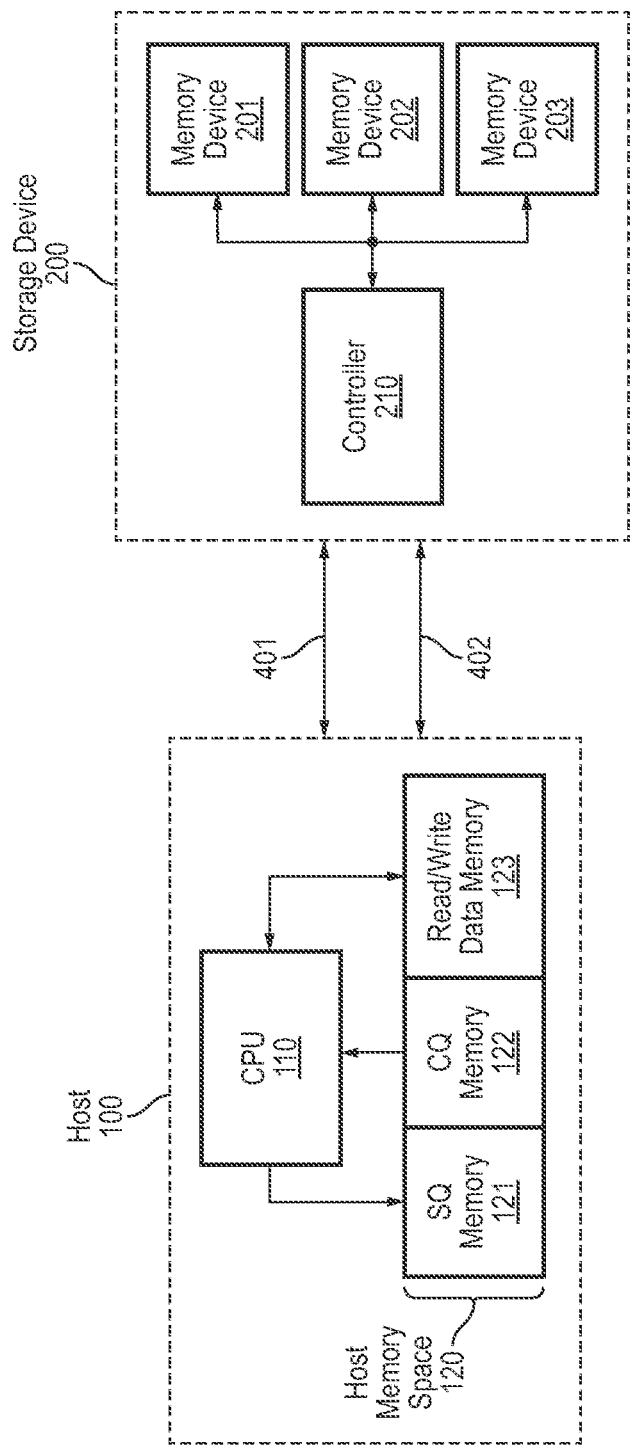
FIG. 3 illustrates a data communication configuration between a host and a storage device according to an embodiment of the present invention.
Figure 4:
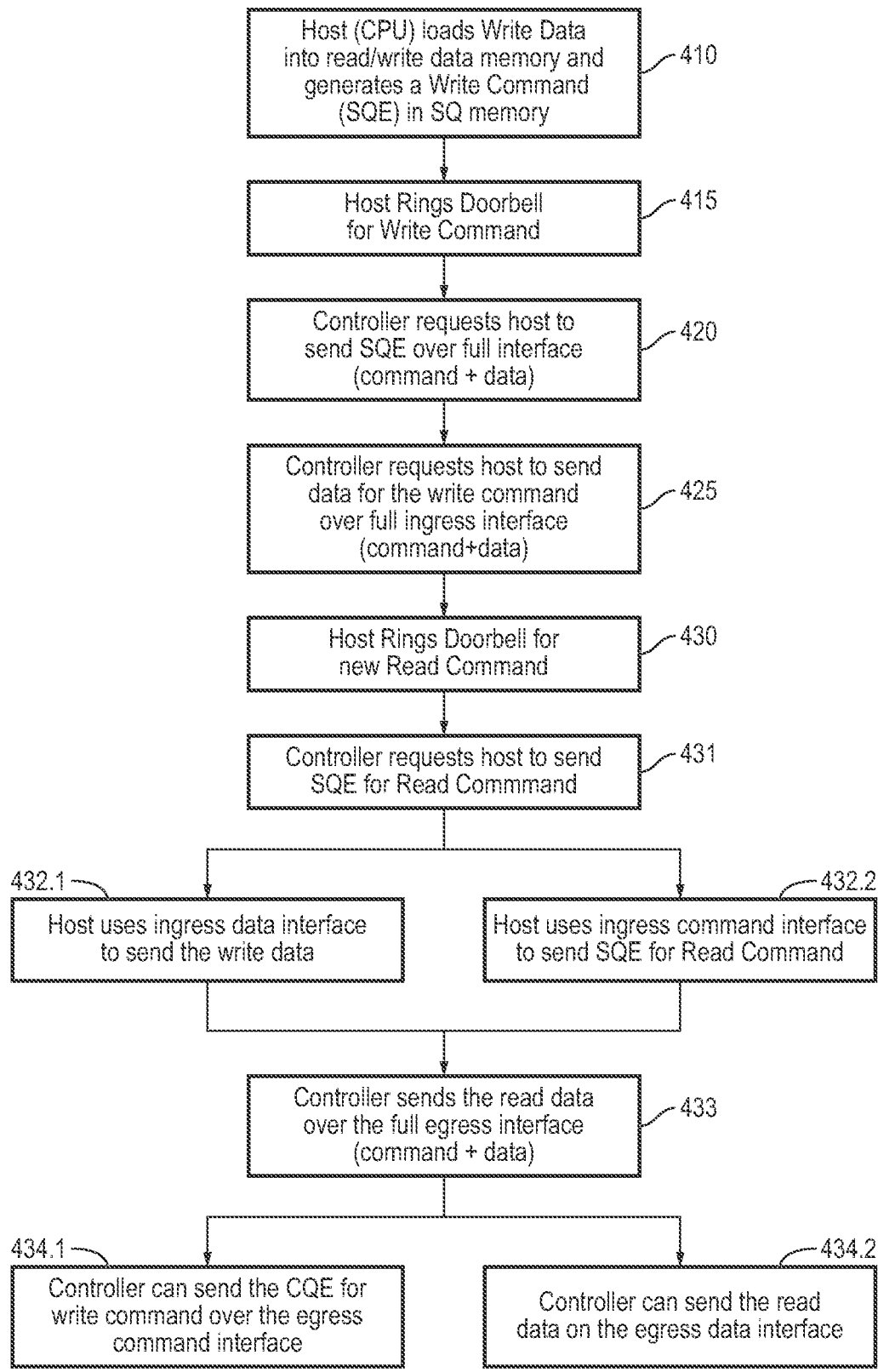
FIG. 4 is a flowchart illustrating a data storage access protocol according to an embodiment of the present invention.
Figure 5:
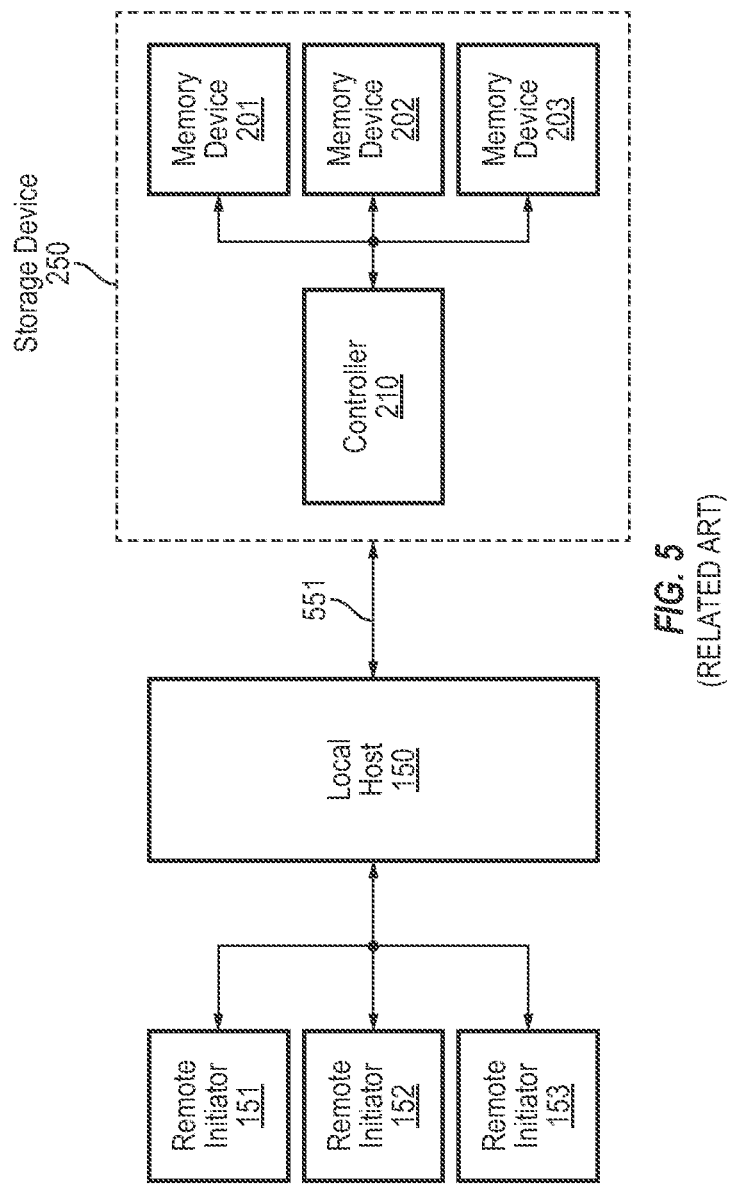
FIG. 5 illustrates a conventional data communication configuration between remote initiators and a storage device.

FIG. 3 illustrates a data communication configuration between a host and a storage device according to an embodiment of the present invention, and FIGS. 4 and 5 are flowcharts illustrating data storage access protocols according to embodiments of the present invention. In FIG. 3, the host 100 and the storage device 200 may be the same or substantially the same as the host 100 and the storage device 200 as illustrated in FIG. 1. However, the communication protocol and/or the communication configuration between the host 100 and the storage device 200 illustrated in FIGS. 3-5 differs from that described above with respect to FIGS. 1 and 2.

In FIG. 3, a Host/Controller interface between the host 100 and the storage device 200 includes a data interface 401 and a command interface 402. As in FIGS. 1 and 2, described above, the Host/Controller interface (e.g., the data interface and command interface 401 and 402) may be a PCIe bus, and in this case, the data interface 401 and the command interface 402 may represent different lanes of the PCIe bus. For example, the data interface 401 and the command interface 402 may not be physically separate interfaces but may be different portions of, such as lanes or channels of, one physical interface between the host 100 and the storage device 200. As one example, in some embodiments, the data interface 401 may refer to lanes 1-6 of an eight lane PCIe bus, and the command interface 402 may refer to lanes 0 and 7 of the eight lane PCIe bus. In other embodiments, the data interface 401 and the command interface 402 may not refer to different lanes or channels but may refer to different bandwidths (e.g., bandwidth allocation) of the interface between the host 100 and the storage device 200, and the bandwidth may be dynamically adjusted by the data access protocol as further discussed below. However, the present invention is not limited thereto, and in other embodiments, the data interface 401 and the command interface 402 may refer to different physical interfaces or connections between the host 100 and the storage device 200, such as separate or independent Advanced Extensible Interfaces (AXIs).

The data interface 401 may be dedicated to handling (e.g., transmitting) write data from the read/write data memory 123 to the controller 210 and read data from the storage device 200 to the read/write data memory 123. The command interface 402 may be dedicated to handling (e.g., transmitting) command traffic between the host 100 and the storage device 200, such as transmission of SQEs (e.g., read commands, write commands, etc.) and CQEs. However, the present invention is not limited thereto, and as will be further described below, the command interface 402 may be repurposed to handle read data and/or write data between the host 100 and the storage device 200 when there is no pending command traffic (e.g., no pending SQEs to be fetched from the SQ memory 121 or CQEs to be generated in the CQ memory 122). Further, when the data interface and command interface 401 and 402 refer to the bandwidth of the interface, the bandwidth may be dynamically allocated and shared to concurrently handle command traffic, such as SQEs and CQEs, and data traffic, such as write data from the host to the controller.

By using the data access protocol shown in FIGS. 3-5, the storage device 200 may be better utilized by handling and/or prioritizing younger read commands under data corresponding to older write commands (e.g., concurrently handling younger read commands and fetching write data corresponding to older write commands) as the storage device 200 may be able to complete the read commands while the write data is proceeding. Further, when the controller 210 is configured to concurrently retrieve write data from the read/write data memory 123 to be written to the memory devices 201-203 and read data from the memory devices 201-203 to be provided to the host 100, the various read/write channels between the controller 210 and the memory devices 201-203 and the data interface 401 may be better utilized as these channels and interfaces support bidirectional traffic (e.g., concurrently handle read and write traffic).

For example, because the command interface 402 is provided between the storage device 200 and host 100, the controller 210 is able to fetch a younger read command from the SQ memory 121 before completing (e.g., while concurrently servicing) an older write command (e.g., before finishing the fetching of the write data of the older write command), thereby the storage device 200 may provide increased read/write IOPS by fetching SQEs from the SQ memory 121 before completing an older write command or by concurrently fetching SQEs from the SQ memory 121 over the command interface 402 as write data is transmitted to the controller 210 over the data interface 401.

Referring to FIG. 4, a data access protocol utilizing the data communication configuration shown in FIG. 3 according to an embodiment of the present invention is illustrated. As one example, the host 100 loads write data to be written to the storage device 200 into the read/write data memory 123 and generates a corresponding write command (SQE) in the SQ memory 121 (step 410). The host 100 then rings a doorbell of the controller 210 corresponding to the write command (SQE) (step 415). In response to the doorbell, the controller 210 requests that the host 100 send the write command (SQE) from the SQ memory 121 via the full ingress interface (e.g., both the command interface 402 and the data interface 401) (step 425). In response to the write command, the host 100 sends the write data from the read/write data memory 123 to the controller 210 via at least the data interface 401. For example, the host 100 may send the write data over the full ingress interface.

As the controller 210 receives the write data from the read/write data memory 123, the host 100 generates a read command (SQE) in the SQ memory 121. Then, the host 100 rings a doorbell of the controller 210 corresponding to the generated SQE (step 430). In response to the doorbell, the controller 210 requests that the host 100 send the read command (SQE) from the SQ memory 121 (step 431). In response, the host 100 transmits the read command (SQE) from the SQ memory 121 via the command interface 402 (step 432.2) while concurrently sending the write data over the data interface 401 (step 432.1). Because the host 100 and the storage device 200 communicate with each other over both the data interface 401 and the command interface 402 (e.g., because the bandwidth of the Host/Controller interface 401 and 402 may be dynamically adjusted to accommodate the read command while concurrently passing the write data), the controller 210 is able to receive the younger read command (SQE) from the SQ memory 121 via the command interface 402 while the controller 210 receives the write data from the read/write data memory 123 in response to the older write command (SQE) via the data interface 401.

In response to the younger read command, the controller 210 retrieves the requested read data from the memory devices 201-203 and sends the read data to the host 100 via the full egress interface (e.g., both the command interface 402 and the data interface 401) (step 433). Because the data interface 401 is bidirectional, the read data and the write data may be concurrently transmitted via the data interface 401 and/or the command interface 402, thereby improving the efficiency, for example, the read/write IOPS, of the storage device 200.

Once the older write command is completed, which may be after the controller 210 completes the younger read command, the controller 210 generates a completion entry (CQE) corresponding to the write command in the CQ memory 122 via the command interface 402 (step 434.1). Concurrently with the sending of the completion entry (CQE), the controller 210 may send the read data to the host 100 via the data interface 401 if the younger read command is not completed when the older write command is completed.

When the controller 210 completes the read command (e.g., when the controllers finishes sending the read data via the data interface 401), the controller generates a completion entry (CQE) corresponding to the younger read command in the CQ memory 122 via at least the command interface 402. When there is no concurrent egress traffic, the controller 210 may send the completion entry (CQE) via the full egress interface (e.g., both the command interface 402 and the data interface 401). The command interface 402 may also be bidirectional. Therefore, the command interface 402 may be able to concurrently transmit SQEs to the controller 210 and CQEs to the host 100.

In another embodiment, after the controller 210 generates the competition entry (CQE) in the CQ memory 122 via the command interface 402, the command interface 402 is repurposed to handle (e.g., to transmit) data, such as the write data. For example, when lanes 0 and 7 of the eight lane PCIe bus are utilized as the command interface 402 and lanes 1-6 are utilized as the data interface 401, the lanes 0 and 7 may be repurposed to be part of the data interface 401 (e.g., to transmit read data and/or write data rather than command traffic) when there is no pending command traffic. Thereby the data traffic may not be slowed down due to reduced bandwidth when there is no pending command traffic. For example, the bandwidth of the Host/Controller interface 401 and 402 (e.g., a single Host/Controller interface) may be allocated to both command traffic (e.g., SQEs and CQEs) and data traffic (e.g., read and write data), and the interface may be shared, dedicated, and/or dynamically changed or prioritized to concurrently handle both command and data traffic. Further, the command interface 402 may be repurposed to transfer data any time there is no pending command traffic, such as between the controller 210 fetching the younger read command and the controller 210 generating the completion entry corresponding to the younger read command. Once the controller 210 finishes fetching the write data from the read/write data memory 123, the command interface 402 is repurposed back to transfer command traffic. Then, the controller 210 generates a completion entry (CQE) corresponding to the older write command in the CQ memory 122 via the command interface.

Similar drawbacks to those discussed with respect to the communication configurations and protocols shown in FIGS. 1 and 2 exist in network storage configurations in which remote initiators (e.g., remote devices) request reads and/or writes to a networked storage device. One such network communication protocol is NVMe over fabrics (NVMeoF). Over such a communication protocol, access to the storage devices, such as the solid-state storage device 200 in FIG. 1, may be limited by the write data fetched by the controller preventing the storage device from retrieving subsequent or younger commands, such as younger read commands, until the write data corresponding to the older write command is completed.

FIG. 5 illustrates a conventional data communication configuration between remote initiators and a storage device. The data communication configuration illustrated in FIG. 5 may be based on the NVMf standard.

In FIG. 5, a plurality of remote initiators 151-153 generate commands (e.g., read and/or write commands) and send them to a target host 150 via a network connection. If the storage device 250 does not support NVMeoF commands (e.g., if the storage device 250 supports only NVMe commands), the target host 150 translates the commands from NVMeoF to NVMe commands for the storage device 250. However, if the storage device 250 supports NVMeoF commands, the target host 150 may send the NVMeoF commands directly to the storage device 250. As shown in FIG. 5, only one interface (e.g., only one target host-to-controller interface) 551 is available between the target host 150 and the storage device 250. Thus, similar to the drawbacks described above with respect to the data communication protocol or configuration illustrated in FIG. 1, the one interface 551 between the target host 150 and the storage device 250 prevents queued commands (e.g., younger read commands) from being fetched by the storage device 250 while the storage device 250 is servicing an older write command (e.g., while data corresponding to the older write command is being fetched from the target host 150 by the storage device 250). Accordingly, younger commands, such as younger read commands, generated by the remote initiators 151-153 cannot be fetched and serviced by the storage device 250 while data is being fetched by the storage device 250, thus leaving some channels within the storage device 250 (e.g., channels between the controller 210 and the memory devices 201-203) unused, reducing the efficiency and performance of the storage device 250.

Figure 6:
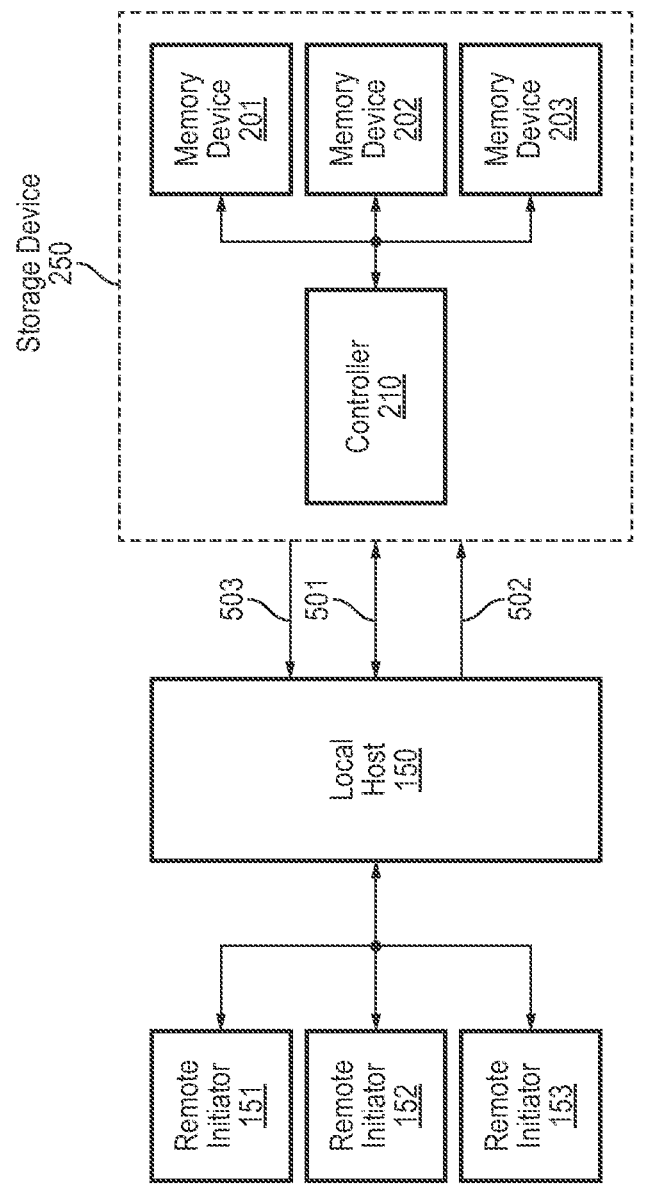
FIG. 6 illustrates a data communication configuration between remote initiators and a storage device according to an embodiment of the present invention.

FIG. 6 illustrates a data communication configuration between remote initiators and a storage device via a target host according to an embodiment of the present invention. In FIG. 6, the storage device 250 may be the same as or substantially similar to the storage device 200 in FIGS. 1 and 3 and/or may be the same as or substantially similar to the storage device 250 in FIG. 5. However, in a network storage environment, such as in the embodiment shown in FIG. 6, the storage device 250 may have additional ports and/or controllers to increase the throughput of the storage device 250 when being accessed by or accessible by multiple remote initiators.

In FIG. 6, a plurality of remote initiators 151-153 are connected (e.g., connected via a network, such as a remote direct memory access (RDMA)-capable network) to a target host 150, such as a server, which may be known as an NVMf target. The target host 150 is connected to the storage device 250 (e.g., to the controller 210 of the storage device 250) via a plurality of interfaces (e.g., a plurality of lanes or channels) 501-503. In one embodiment, the interfaces 501-503 may be separate AXI interfaces. However, as discussed above, the present invention is not limited thereto, and in other embodiments, the target host 150 and the storage device 250 may communication via only one PCIe interface. In such an embodiment, the interfaces 501-503 may be different lanes or channels of the one PCIe interface, or may represent bandwidth of the one PCIe interface that is dynamically adjusted to allow different types of traffic.

The remote initiators 151-153 generate commands (e.g., read and/or write commands) and send them to the target host 150 via the network connection. For example, the remote initiators may transmit an in-capsule command and data to the storage device via the host. The target host 150 then, if necessary, translates the command and rings a doorbell of the controller 210 of the storage device 250, alerting the controller 210 to the presence of the command. When the controller 210 supports NVMeoF commands, the target host 150 may directly pass the commands to the controller 210 without translation. When the controller 210 supports only some of the commands received by the target host 150, the target host 150 may pass the commands the controller 210 does support directly to the controller 210 and may translate the commands the controller 210 does not support into a format the controller 210 does support.

In FIG. 6, the interfaces 501, 502, and 503 connect the target host 150 to the storage device 250. The interface 501 may be a command interface 501 configured to transmit command traffic (e.g., read and/or write commands (SQEs)) from the target host 150 to the storage device 250 and to transmit response traffic (e.g., completion entries (CQEs)) from the storage device 250 to the target host 150. The interface 502 may be a first data interface 502 configured to transmit write data from the target host 150 to the storage device 250. The interface 503 may be a second data interface 503 configured to transmit read data from the storage device 250 to the target host 150.

Figure 7:
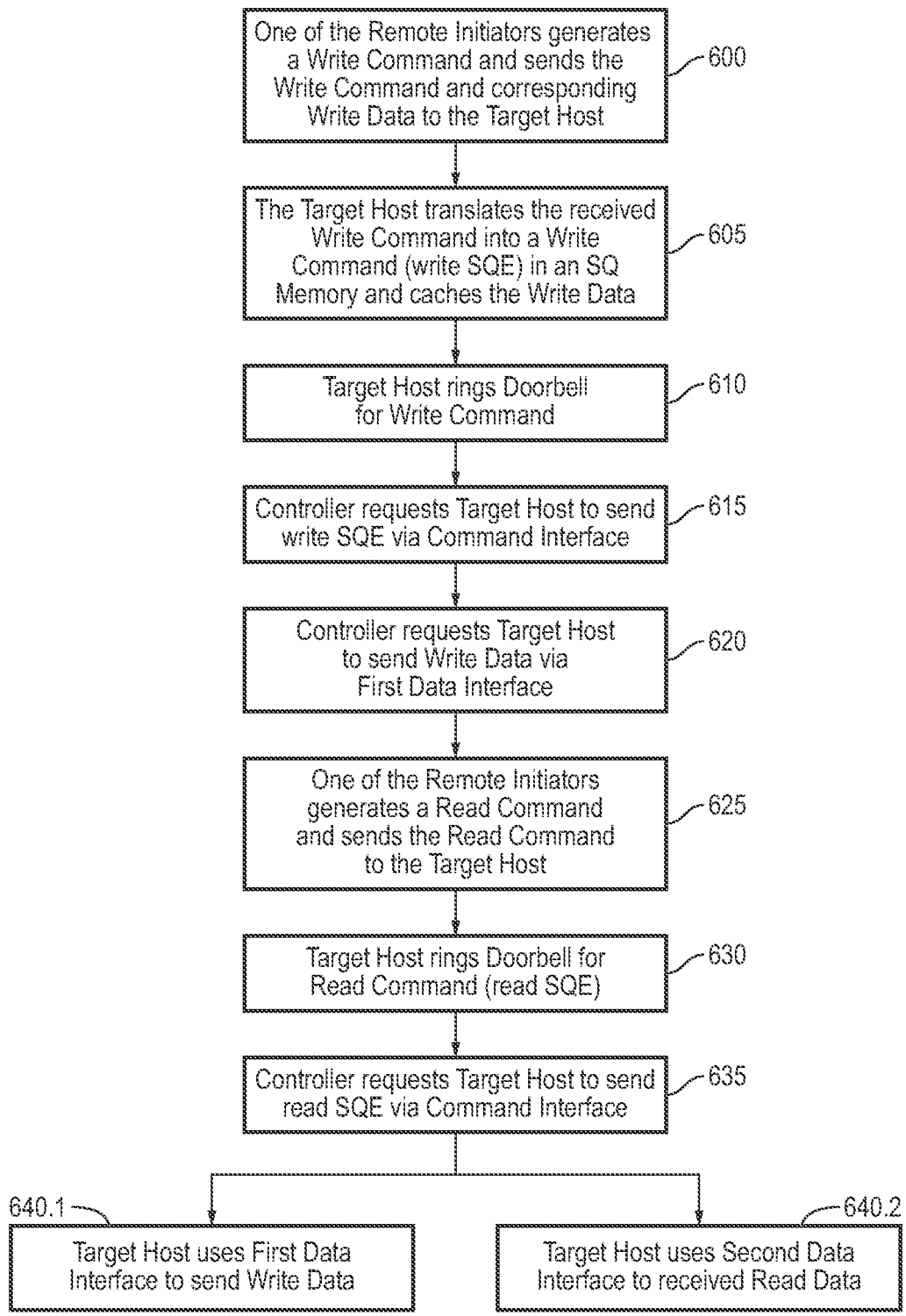
FIG. 7 is a flowchart illustrating a data storage access protocol according to an embodiment of the present invention.

Referring to FIG. 7, when one of the remote initiators 151-153 generates a write command, it sends the write command and corresponding write data to be written to the storage device 250 to the target host 150 (step 600). The target host 150 translates the received write command into a write command (SQE) in an SQ memory and caches the write data to be written in a memory in the target host 150 (step 605). Then, the target host 150 rings a doorbell of the controller 210 of the storage device 250 (step 610). In response, the controller 210 retrieves the write command (SQE) from the target host 150 via the command interface 501 (step 615) and then begins fetching the write data from the target host 150 via the first data interface 502 (step 620).

While the storage device 250 is fetching the write data from the target host 150 via the first data interface 502, the one of the remote initiators 151-153 or another one of the remote initiators 151-153 may generate another command (e.g., a read command), which is sent to the target host 150 via the network connection (step 625). The target host 150 translates the received command into an entry (SQE) in the SQ memory of the target host 150. The target host 150 then rings a doorbell of the controller 210 (step 630). In response, the controller 210 fetches the command (SQE) from the SQ memory via the command interface 501 (step 635). Because the controller 210 is fetching the write data via the first data interface 502 (step 640.1), the controller 210 is able to concurrently fetch the younger command (SQE) from the target host 150 via the command interface 501 (step 635), thereby allowing the younger command (e.g., the younger read command) to be serviced concurrently with (or prioritized over) the older write command, improving the efficiency of the storage device 250. For example, one or more of the remote initiators 151-153 may transmit an in-capsule command and data to the storage device via the host concurrently with the transmitting the write data to the storage device via the host.

When the command is a read command, the storage device 250 sends the requested read data to the target host 150 via the second data interface 503 (step 640.2). Because the first and second data interfaces 502 and 503 are separate, the target host 150 and the storage device 250 are able to concurrently transmit read and write data therebetween. However, the present invention is not limited thereto. In some embodiments, only the command interface 501 and the first data interface 502 may be present. In such embodiments, the first data interface 502 may be bidirectional and, therefore, configured to concurrently transmit read and write data between the target host 150 and the storage device 250.

Although the present invention has been described with reference to the example embodiments, those skilled in the art will recognize that various changes and modifications to the described embodiments may be performed, all without departing from the spirit and scope of the present invention. Furthermore, those skilled in the various arts will recognize that the present invention described herein will suggest solutions to other tasks and adaptations for other applications. It is the applicant's intention to cover by the claims herein, all such uses of the present invention, and those changes and modifications which could be made to the example embodiments of the present invention herein chosen for the purpose of disclosure, all without departing from the spirit and scope of the present invention. Thus, the example embodiments of the present invention should be considered in all respects as illustrative and not restrictive, with the spirit and scope of the present invention being indicated by the appended claims and their equivalents.

What is claimed is:

1. A non-volatile storage system comprising:
 a first device comprising a first queue, a second queue, and a memory; and
 a storage device comprising:
  a controller configured to communicate with the memory and with at least one of the first queue or the second queue; and
  a second device configured to communicate with the controller,
 wherein a physical interface connecting the controller to the first device is configured to be used by the first device to send first data from the memory, and wherein, based on the controller detecting a first command, the physical interface is configured to transport a first portion of the first data from the memory to the controller, wherein, based on the controller detecting a second command:

a first portion of the physical interface is configured to transport the second command from the first queue to the controller; and a second portion of the physical interface is configured to transport a second portion of the first data from the memory to the controller.

2. The non-volatile storage system of claim 1, wherein the controller is configured to receive the first data from the memory and transmit third data to the second queue, wherein the physical interface is configured to be used by the first device to send the first data from the memory and transmit the third data to the second queue, and wherein the physical interface is configured to prioritize the third data to the second queue over the first data from the memory.

3. The non-volatile storage system of claim 2, wherein the first data or the third data is configured to be transmitted via one or more communication lanes of the physical interface.

4. The non-volatile storage system of claim 3, wherein the one or more communication lanes are dynamically configurable.

5. The non-volatile storage system of claim 1, wherein the physical interface is configured to operate according to a non-volatile memory express (NVMe) communication protocol.

6. A non-volatile storage system comprising:
a first device comprising a queue, and a memory; and
a storage device comprising:
a controller configured to communicate with the memory and the queue; and
a second device configured to communicate with the controller,
wherein, based on the controller detecting a first command, receiving by the controller a first portion of first data from the memory over a first interface and a second interface,
wherein, based on the controller detecting a second command:
receiving by the controller the second command from the queue over the first interface; and
receiving by the controller a second portion of the first data from the memory over the second interface.

7. The non-volatile storage system of claim 6, wherein the storage device is configured to communicate with the first device via a communication bus having one or more lanes.

8. The non-volatile storage system of claim 7, wherein the communication bus includes a peripheral component interconnect express (PCIe) bus.

9. The non-volatile storage system of claim 7, wherein the first interface comprises a first subset of the one or more lanes of the communication bus, and the second interface comprises a second subset of the one or more lanes of the communication bus different from the first subset.

10. The non-volatile storage system of claim 6, wherein the first interface is configured to operate according to a non-volatile memory express (NVMe) communication protocol.

11. The non-volatile storage system of claim 6, wherein the second interface is configured to operate according to a non-volatile memory express (NVMe) communication protocol.

12. A method of data storage access between a first device and a non-volatile storage device, the first device comprising a queue and a memory, the non-volatile storage device comprising a controller configured to communicate with the memory and the queue, and a second device configured to communicate with the controller, the method comprising:

based on the controller detecting a first command, receiving by the controller a first portion of first data over a first interface and a second interface; and based on the controller detecting a second command, receiving by the controller the second command from the queue over the first interface, and receiving by the controller a second portion of the first data from the memory over the second interface.

13. The method of claim 12, wherein the first portion of the first data is for writing to the non-volatile storage device.

14. The method of claim 13, wherein the second portion of the first data is for writing to the non-volatile storage device.

15. The method of claim 13, wherein the first command includes a write command, and the second command includes a read command.

16. The method of claim 12, wherein the first interface and the second interface include a peripheral component interconnect express (PCIe) bus having one or more lanes.

17. The method of claim 16, wherein the one or more lanes are dynamically configurable.

18. The method of claim 16, wherein the first interface comprises a first subset of the lanes of the PCIe bus, and the second interface comprises a second subset of the lanes of the PCIe bus different from the first subset.

19. The method of claim 12, wherein the first interface and the second interface communicate over a physical interface configured to operate according to a non-volatile memory express (NVMe) communication protocol.

* * * * *